United States Patent Office 3,798,214
Patented Mar. 19, 1974

3,798,214
PROCESS FOR THE MANUFACTURE OF NEW STEROID EPOXIDES OF THE 19-NOR-PREGNENE SERIES
Georg Anner and Jaroslav Kalvoda, Basel, Switzerland, assignors to Ciba-Geigy Corporation, Ardsley, N.Y.
No Drawing. Filed Jan. 20, 1972, Ser. No. 219,562
Claims priority, application Switzerland, Feb. 5, 1971, 1,731/71
Int. Cl. C07c 173/00
U.S. Cl. 260—239.55 R                  6 Claims

ABSTRACT OF THE DISCLOSURE

The invention relates to new gestagenic compounds of the formula

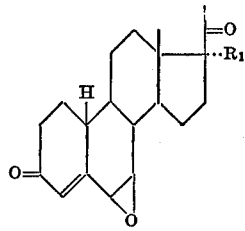

wherein $R_1$ represents a free or esterified hydroxy group.

The compounds are prepared by conventional methods. They display a strong gestagenic action at low doses at which an ovulating inhibiting action is not present.

---

The present invention relates to the manufacture of new steroid epoxides of the general formula

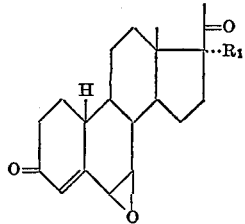

in which $R_1$ represents a free or esterified hydroxy group.

The esterified hydroxy groups mentioned hereinbefore are chiefly those which are derived from organic carboxylic acids of the aliphatic, alicyclic, araliphatic or aromatic series, in particular from those containing from 1–12 carbon atoms, especially from lower aliphatic acids having 1–6 carbon atoms, for example from formic acid, acetic acid, propionic acid, butyric acids, valeric acids, such as n-valeric acid, trimethylacetic acid, trifluoroacetic acid, or from the capronic acids, such as β-trimethyl-propionic acid or diethylacetic acid; or from enanthic, caprylic, pelargonic, capric acids, undecylic acids, for example undecylenic acid; or from cyclopropane-, cyclobutane-, cyclopentane- and cyclohexanecarboxylic acid; from cyclobutyl-, cyclopentyl-, cyclohexyl- or phenylacetic acids or phenylpropionic acids; from benzoic acid, pnenoxyacetic acids, such as phenoxyacetic acid, dicarboxylic acids, such as succinic acid or phthalic acid, or from inorganic acids such, for example, as phosphoric or sulphuric acids.

The compounds of the Formula I possess valuable pharmacological properties. In particular, they display a gestagen activity as is observed in animal experiments, for example when administered orally in doses of from 0.01–0.5 mg./kg. in the Clauberg test on castrated rabbits. It is only possible to observe any hint of an adverse or inhibiting effect on the ovulation with oral doses of 100 mg./kg., as experiments on cyclized rats have shown. There is, therefore, no adverse or inhibiting effect on the ovulation in the case of doses which produce a gestagen action. In particular, the Δ⁴-3,20-dioxo-6β,7β-oxido-17α-acetoxy-19-norpregnene shows a pronounced gestagenic action at a dose of 0.04 mg./kg. in the said test on castrated rats, without any ovulation inhibiting action, which appears only at the said dose of about 100 mg./kg.

The new compounds may therefore be used as gestagens. Moreover, they are also suitable for controlling fertility. However, the new compounds are also valuable intermediate products for the manufacture of other useful substances, in particular of pharmacologically active compounds.

The new compounds according to the present invention can be manufactured according to methods which are known per se. In particular, they may be manufactured by treating compounds of the formula

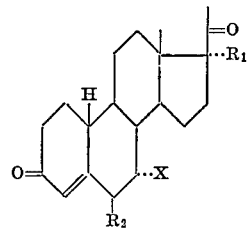

wherein $R_1$ and $R_2$ represent free or esterified hydroxy groups and X represents a leaving group, in an inert solvent with a basic reagent and optionally esterifying a free 17α-hydroxy group or converting an esterified 17α-hydroxy group into a free hydroxy group.

The leaving group X mentioned hereinabove may, for example, be a halogen atom, such as chlorine, bromine or iodine, or a hydroxy group which is esterified with an aliphatic or aromatic sulphonic acid or an aromatic carboxylic acid which carries activating substituents in the ortho- and/or para-position.

As basic reagents for the epoxide formation there are used in particular aqueous solutions of alkali metal hydroxides, for example sodium hydroxide or potassium hydroxide, or alkali metal salts of weak acids, for example alkali metal carbonates, hydrogen carbonates or acetates. Also suitable as basic reagents are alkali metal alcoholates of tertiary alcohols, for example potassium tert.butylate.

The solvents used for the basic treatment according to the invention of the starting materials are preferably those which are miscible with water, in particular lower aliphatic alcohols, for example methanol, or ethanol; lower aliphatic ketones, for example acetone; ethers, for example tetrahydrofuran or dioxan; alkylsulphoxides, for example dimethyl sulphoxide; or mixtures of these solvents, optionally with the addition of chloroform or methylene chloride, in order to improve the solubility.

The two groups $R_1$ and $R_2$ contained in the starting materials may be free or esterified hydroxy groups. Esterified hydroxy groups are chiefly those which are derived from one of the carboxylic acids cited on page 2, in which case only one or both of the 6β- and 17α-hydroxy groups may be esterified. Both hydroxy groups may be esterified with the same or with different carboxylic acids. When using starting materials of the Formula II, in which $R_1$ represents an esterified hydroxy group and $R_2$ represents a free hydroxy group, it is possible—by a suitable choice of basic reagent and reaction conditions—to control the cyclization reaction in such a manner that the 17α-acyloxy group is maintained, or is saponified to a free hydroxy group during the cyclization reaction.

The esterification of the 17α-hydroxy group in compounds of the Formula I, in which $R_1$ represents a free hydroxy group, may take place in known manner, in particular by treating the 17α-hydroxy compound with an acid anhydride or acid chloride in a basic agent at elevated temperature, for example with acetic anhydride and pyridine under reflux temperature. Another possible means of acylation consists in treating the 17α-hydroxy compound with trifluoroacetic anhydride and the acid desired for acylation.

The subsequent liberation of 17α-hydroxy groups in compounds of the Formula I, in which $R_1$ represents an esterified hydroxy group, takes place likewise in known manner by treatment with a basic agent in a suitable solvent, care being taken that the 6β,7β-oxido group is not attacked under the reaction conditions. Suitable basic agents and solvents include above all those which have been cited hereinbefore for the cyclization reaction of compounds of the Formula II.

It is possible to obtain the starting materials of the Formula II, in which X represents a halogen atom, from corresponding $\Delta^{4,6}$-3-oxo - 19 - norpregnadienes in known manner by addition of a hypohalous acid to the $\Delta^6$-double bond. For this purpose there are used derivatives of a hypohalous acid, for example N-bromacetamide, N-bromosuccinimide or tert.butyl hypochlorite. According to a preferred embodiment of the invention, the $\Delta^{4,6}$-3-oxo-19-nor steroid is treated in formic acid with tert.butyl hypochlorite and the resulting 6β-formyloxy-7α-chloro derivative hydrolyzed under basic conditions.

The starting materials of the Formula II, in which X represents a hydroxy group esterified with a sulphonic acid or an aromatic carboxylic acid which carries activating substituents in the ortho- and/or para-position, may be obtained in known manner from the corresponding $\Delta^{4,6}$-3-oxo-19-norpregnadienes in such a manner that, after epoxidizing these compounds with a peracid, the epoxide ring in the resulting 6α,7α-oxido derivatives is opened to give a 6β-acetoxy - 7α - hydroxy derivative by treatment with acetic acid and traces of p-toluenesulphonic acid, and the 7α-hydroxy group is esterified by treatment with reactive derivatives of aliphatic or aromatic sulphonic acids or of aromatic carboxylic acids which carry activating substituents, in particular the halides thereof, for example methanesulphonic acid chloride, ethanesulphonic acid chloride, p-toluenesulphonic acid chloride or p-nitrobenzoyl chloride, in the presence of a tertiary base, for example pyridine, optionally with the addition of an inert solvent, such as benzene, methylene chloride, chloroform, or dioxan.

The invention also relates to those embodiments of the process in which a compound obtainable as an intermediate product at any stage is used as starting material and the missing steps of the process are carried out, or in which a starting material is formed under the reaction conditions.

The present invention relates also to the manufacture of pharmaceutical preparations for use in human or veterinary medicine which contain the new pharmacologically active substances of the present invention hereinabove described together with a pharmaceutical carrier. As carriers there are used organic or inorganic materials which are suitable for enteral, for example oral, parenteral or topical administration. Suitable carriers are substances which do not react with the new compounds, for example water, gelatin, lactose, starch, magnesium stearate, talcum, vegetable oils, benzyl alcohols, gums, polyalkylene glycols, vaseline, cholesterol and other known medicinal carriers. The pharmaceutical preparations may be in solid form, for example tablets, coated tablets or capsules, or in liquid or semi-liquid form, for example solutions, suspensions, emulsions, ointments or creams. They may be sterilized and/or contain assistants, such as preservatives, stabilizers, wetting agents or emulsifying agents, salts for regulating the osmotic pressure or buffers. They may also contain other therapeutically useful substances. The new compounds may also be used as starting products for manufacturing other valuable compounds.

The compounds of the present invention may also be used as additives for animal feeds.

The following examples describe the invention.

EXAMPLE 1

9.7 grams of $\Delta^4$ - 3,20-dioxo-6β-hydroxy-7α-chloro-17α-acetoxy-19-nor-pregnene are dissolved in a mixture of 1700 ml. of methanol and 195 ml. of chloroform and, upon addition of 348 ml. of N sodium hydroxide solution, the whole mixture is stirred for 2 minutes at room temperature under nitrogen. The reaction mixture is then poured on ice water, diluted with chloroform and the aqueous phase is extracted with chloroform. The extracts are washed with water until neutral, dried, and evaporated in a water jet vacuum. A crude crystalline product is obtained which is dissolved in toluene and chromatographed on silica gel. The fractions eluted with a toluene/ethyl acetate mixture (4:1) yield, after recrystallization once from methylene chloride-ether/petroleum ether, the pure $\Delta^4$ - 3,20-dioxo-6β,7β-oxido-17α-acetoxy-19-norpregnene which has a double melting point of 174° C. and 184–185° C. $[\alpha]_D^{20} = -129°$ (CHCl$_3$; c.=0.365); UV spectrum: 241 nm. ($\epsilon$=17,100).

The $\Delta^4$ - 3,20-dioxo-6β-hydroxy-7α-chloro-17α-acetoxy-19-nor-pregnene used as starting material is manufactured as follows:

To a solution of 20 g. of $\Delta^{4,6}$-3,20-dioxo-17α-acetoxy-19-nor-pregnadiene in 380 ml. of formic acid are added dropwise within 2 minutes 6.25 ml. of tert.butyl hypochlorite. The reddish brown reaction solution is then stirred for 30 minutes at 100° C. and for 3 hours at room temperature, then poured on 1.5 ml. of ice water. The precipitate which has formed is filtered with suction, washed with water, dissolved in an ether/methylene chloride mixture (4:1), washed successively with water, ice-cold N sodium hydroxide solution and water, dried, and evaporated in a water jet vacuum at about 35° C. bath temperature. The resulting crude product is dissolved in 260 ml. of methanol. To this solution is added a solution of 260 mg. of potassium carbonate in 6.5 ml. of water and the mixture is boiled for 15 minutes under reflux. The reaction mixture is poured on ice water and worked up as described hereinbefore with ether/methylene chloride. The amorphous mixture which occurs is dissolved in a 100 ml. toluene/ethyl acetate mixture (9:1) in order to purify it and chromatographed on 1 kg. of silica gel (Merck). Elution with a toluene/ethyl acetate mixture (4:1) yields a mixture consisting i.a. of starting material and the corresponding 4-chloro compound. Elution with toluene/ethyl acetate (1:1) finally yields pure $\Delta^4$-3,20-dioxo-6β-hydroxy-7α-chloro-17α-acetoxy-19-norpregnene.

By proceeding in analogous manner, the compound $\Delta^4$-3,20-dioxo-6β,7β-oxido-17α-caproyloxy - 19 - norpregnene is manufactured from $\Delta^{4,6}$ - 3,20-dioxo-17α-caproyloxy-19-norpregnadiene.

EXAMPLE 2

Pharmaceutical preparation in the form of tablets containing $\Delta^4$-3,20-dioxo-6β,7β-oxido-17α-acetoxy - 19 - norpregnene for the oral administration.

|  | Mg. |
|---|---|
| $\Delta^4$-3,20-dioxo-6β,7β-oxido-17α-acetoxy - 19 - norpregnene | 1.0 |
| Lactose | 70.0 |
| Wheat starch | 42.0 |
| Gelatine | 3.0 |
| Arrow-root | 17.0 |
| Magnesium stearate | 0.7 |
| Talcum | 6.3 |
|  | 140.0 |

Formulation.—The active principle is mixed with lactose and wheat starch and moistened with a 10% gelatine solution to form a slightly plastic dough which is then granulated in known manner, dried at 40° and reduced to the conventional particle size by being sifted. The dry granulate is mixed with arrow-root, magnesium stearate and talcum and the whole is mixed and pressed to form tablets of 7 mm. of diameter.

EXAMPLE 3

Oily injection solutions in ampoules containing 75 mg. of $\Delta^4$-3,20-dioxo-6$\beta$,7$\beta$-oxido-17$\alpha$-capronyloxy - 19 - nor-pregnene in 1 ml.

Preparation.—7.5 g. of $\Delta^4$-3,20-dioxo-6$\beta$,7$\beta$-oxido-17$\alpha$-capronyloxy-19-nor-pregnene are dissolved in 10 ml. of benzyl alcohol. The solution is then diluted with sesame oil at 40°. 1 ml. ampoules are then fillted with this solution and the ampoules are sterilized at 160° for about one and a half hours.

We claim:
1. Compounds of the formula

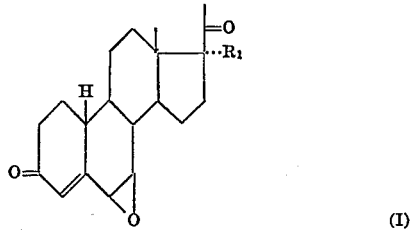

(I)

wherein $R_1$ represents a free or esterified hydroxy group, each of said esterified hydroxyl groups being derived from a carboxylic acid having 1 to 12 carbon atoms or phosphoric or sulfuric acids.

2. Compounds according to claim 1, wherein the esterified 17$\alpha$-hydroxy group is derived from aliphatic, aromatic or araliphatic carboxylic acids containing from 1–12 carbon atoms.

3. Compounds according to claim 2, wherein the esterified 17$\alpha$-hydroxy group is derived from lower aliphatic carboxylic acids having from 1 to 6 carbon atoms.

4. $\Delta^4$-3,20-dioxo-6$\beta$,7$\beta$-oxido-17$\alpha$-hydroxy - 19 - nor-pregnene.

5. $\Delta^4$-3,20 - dioxo-6$\beta$,7$\beta$-oxido-17$\alpha$-acetoxy - 19 - nor-pregnene.

6. $\Delta^4$-3,20-dioxo-6$\beta$,7$\beta$-oxido-17$\alpha$-caproyloxy - 19 - nor-pregnene.

References Cited

UNITED STATES PATENTS 3,211,758 10/1965 Tarkoey _____ 260—397.2
3,250,792 5/1966 Wettstein et al. _____ 260—397.1

OTHER REFERENCES

Shoppee et al., Chem. Soc. Jour. (1958), pp. 1659–1663, pp. 1659–62 relied upon.

HENRY A. FRENCH, Primary Examiner

U.S. Cl. X.R.

260—397.4; 424—241